United States Patent [19]

Sasaki et al.

[11] Patent Number: 4,693,553

[45] Date of Patent: Sep. 15, 1987

[54] LIGHT-TRANSMITTING FIBER

[75] Inventors: Isao Sasaki, Hiroshima; Kozi Nishida; Masaru Morimoto, both of Otake; Takashi Yamamoto, Hiroshima, all of Japan

[73] Assignee: Mitsubishi Rayon Company Ltd., Tokyo, Japan

[21] Appl. No.: 705,634

[22] Filed: Feb. 26, 1985

[30] Foreign Application Priority Data

Mar. 2, 1984 [JP] Japan .................. 59-40077
Mar. 5, 1984 [JP] Japan .................. 59-41825

[51] Int. Cl.$^4$ ............................................. D02G 3/00
[52] U.S. Cl. ............................ 350/96.34; 350/96.29
[58] Field of Search ............................ 264/1.5, 2.7; 350/96.29, 96.30, 96.31, 96.32, 96.33, 96.34

[56] References Cited

U.S. PATENT DOCUMENTS 4,246,374 1/1981 Kopchik ............................. 525/329
4,544,235 10/1985 Nishida et al. .................. 350/96.34

FOREIGN PATENT DOCUMENTS 6049415 12/1976 Japan .......................... 350/96.34
0116701 7/1984 Japan .......................... 350/96.34
0247605 12/1985 Japan .......................... 350/96.34

Primary Examiner—Eugene R. LaRoche
Assistant Examiner—Steven J. Mottola
Attorney, Agent, or Firm—Oblon, Fisher, Spivak, McClelland, & Maier

[57] ABSTRACT

A plastic light-transmitting fiber having a core-sheath structure. A polymer having methacrylimide or N-substituted methacrylimide units is used for the core component. A polymer having a refractive index smaller by at least 1% than that of the polymer of the core component is used for the sheath component. The heat resistance of the light-transmitting fiber is highly improved.

9 Claims, 1 Drawing Figure

LIGHT-TRANSMITTING FIBER

BACKGROUND OF THE INVENTION (1) Field of the Invention

The present invention relates to a light-transmitting fiber. More specifically, the present invention relates to a step-index type plastic light-transmitting fiber excellent in heat resistance.

(2) Description of the Related Art

Inorganic-glass-type optical fibers having an excellent light-transmitting property over a broad wavelength range are known. However, glass-type fibers are poor in the processability and the resistance to flexural stress and are expensive. Accordingly, light-transmitting fibers composed mainly of synthetic resins have been proposed and developed. Synthetic resin light-transmitting fibers are ordinarily obtained by preparing a fiber having a core-sheath structure including a core composed of a polymer which has a large refractive index and a good light-transmitting property and a sheath composed of a transparent polymer having a smaller refractive index than that of the polymer of the core. An amorphous polymer is valuable as the core polymer having a high light-transmitting property. Poly(methyl methacrylate) or polystyrene is ordinarily used.

Poly(methyl methacrylate) is excellent in not only transparency but also mechanical properties and weatherability. This polymer is produced on an industrial scale as a core material of a high-performance plastic optical fiber and is being used in the fields of short-distance optical communications and optical sensors. However, the heat distortion temperature of poly(methyl methacrylate) is about 100° C., and the heat resistance is not sufficient. Therefore, the applications of this polymer are limited in some fields. Accordingly, it is eagerly desired to improve the heat resistance.

The following methods are known for improving the heat resistance in methacrylic resins.

(1) Copolymerization of methyl methacrylate with α-methylstyrene.

(2) Dissolution of poly-α-methylstyrene in monomeric methyl methacrylate and then polymerization of methyl methacrylate (see Japanese Examined Patent Publication (Kokoku) No. 43-1616 and No. 49-8718).

(3) Copolymerization of methyl methacrylate with N-allylmaleic acid amide (see Japanese Examined Patent Publication (Kokoku) No. 43-9753).

(4) Copolymerization of methyl methacrylate with α-methylstyrene and maleimide.

(5) Polymerization of methyl methacrylate in the presence of a crosslinked polymer formed by using a polyfunctional monomer (see Japanese Unexamined Patent Publication (Kokai) No. 48-95490 and No. 48-95491).

These methods enable improved heat resistance in the obtained polymers, however, are still insufficient on several points. For example, the polymerization speed and productivity are extremely low and so the practical utility is poor. Moreover, the obtained polymers are poor in mechanical properties or optical properties, suffer from conspicuous discoloration at the molding step, or suffer from low moldability. Therefore, these methods are not used much at all in practice.

SUMMARY OF THE INVENTION

It is therefore a primary object of the present invention to provide a light-transmitting fiber having an excellent light-transmitting property, which includes a core component polymer excellent not only in optical properties, mechanical properties, weatherability, and moldability but also in heat resistance and productivity and comparable to polymethacrylic acid ester resins in these properties and a sheath component polymer having excellent heat resistance and transparency.

We made research with a view to attaining the above object. As a result, we found that a polymer containing ring structural units composed of methacrylimide or N-substituted methacrylimide has such excellent heat resistance, moldability, light-transmitting properties, and mechanical properties and also good productivity. When this polymer is used as a core component polymer, a light-transmitting fiber with well-balanced characteristics can be obtained. We completed the present invention based on this finding.

More specifically, in accordance with the present invention, there is provided a light-transmitting fiber including a core component and a sheath component covering the core component, the core component consisting essentially of a polymer including 2% to 100% by weight of ring structure units represented by the following general formula (I):

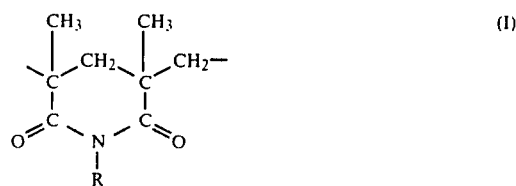

wherein R stands for a hydrogen atom or an aliphatic, alicyclic, or aromatic hydrocarbon group having 1 to 20 carbon atoms, and 0% to 98% by weight of monomer units composed mainly of methyl methacrylate, and the sheath component being composed of a polymer having a refractive index smaller by at least 1% than that of the polymer of the core component.

DESCRIPTION OF THE PREFERRED EMBODIMENTS

Figure 1:
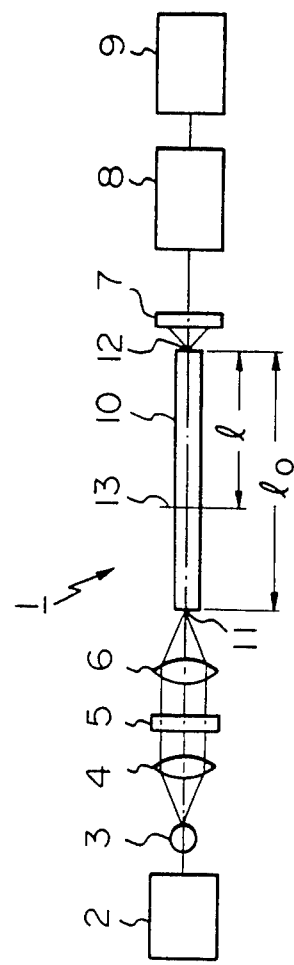
FIG. 1 is a diagram illustrating an apparatus used for measuring light transmission loss in the examples of the present invention.

In the light-transmitting fiber of the present invention, the core component polymer is a polymer including 2% to 100% by weight of ring structure units represented by the general formula (I) and 0% to 98% by weight of monomer units composed mainly of methyl methacrylate. The ring structure units represented by the general formula (I) are necessary for maintaining high heat resistance and optical characteristics in the light-transmitting fiber. The content of the units should be at least 2% by weight. In order to obtain especially excellent heat resistance, it is preferred that the content of the units represented by the general formula (I) be at least 10% by weight.

If the content of the methacrylimide or N-substituted methacrylimide ring structure units is lower than 2% by weight, the heat resistance in the obtained polymer is insufficiently improved.

The monomer units composed mainly of methyl methacrylate are necessary for maintaining the basic properties of the light-transmitting fiber, such as optical properties, weatherability, and mechanical properties, at sufficient levels.

In the methacrylimide component represented by the structural formula (I), the N-substituent R should be a hydrogen atom or a saturated or unsaturated aliphatic, alicyclic, or aromatic hydrocarbon group having 1 to 20 carbon atoms.

From the viewpoint of the improvement of the heat resistance, it is preferred that R in the general formula (I) be a hydrogen atom or hydrocarbon group having a small number of carbon atoms, e.g., an aliphatic hydrocarbon group of 1 to 4 carbon atoms or an aromatic hydrocarbon group of 6 to 10 carbon atoms.

As specific examples of the N-substituent R, there can be mentioned methyl, ethyl, propyl, isopropyl, butyl, isobutyl, tert-butyl, phenyl, and substituted phenyl groups. A methyl group is most preferred.

The monomer component composed mainly of methyl methacrylate may include, in addition to methyl methacrylate, a small amount, preferably up to 20% by weight, of at least one other monomer selected from methyl acrylate, ethyl methacrylate, butyl methacrylate, cyclohexyl methacrylate, benzyl methacrylate, methacrylic acid, acrylic acid, styrene, and α-methylstyrene.

The monomer component composed mainly of methyl methacrylate may further include, in addition to the above-mentioned comonomer, at least one polyfunctional reactive monomer selected from divinylbenzene, triallyl cyanurate, triallyl isocyanurate, ethylene glycol dimethacrylate, triethylene glycol dimethacrylate, and trimethylolpropane trimethacrylate.

The core component polymer of the light-transmitting fiber of the present invention may be prepared by heating and condensing poly(methyl methacrylate) or the above-mentioned copolymer composed mainly of a methyl methacrylate monomer with an imidizing agent such as ammonia, a primary aliphatic amine or a primary aromatic amine, and a compound capable of generating a primary amine under heating, such as urea or a 1,3-disubstituted urea, to form an intended N-substituted methacrylimide polymer.

The heat-treatment temperature adopted for formation of the methacrylimide or N-substituted methacrylimide component is at least 100° C., preferably 130° C. to 450° C., especially preferably 150° C. to 300° C. In order to prevent an abnormal reaction, it is preferred that the heat treatment be carried out in an autoclave in an atmosphere of an inert gas such as nitrogen or argon.

In order to inhibit thermal deterioration of the polymer at this heating reaction, a heat-deterioration preventing agent such as an antioxidant may be added.

As the antioxidant, there can be mentioned a phosphite type antioxidant, a hindered phenol type antioxidant, a sulfur type antioxidant, and an amine type antioxidant.

As the phosphite type antioxidant, there can be mentioned phosphorous acid esters such as tricresyl phosphite, cresylphenyl phosphite, trioctyl phosphite, and tributoxyethyl phosphite.

As the hindered phenol type antioxidant, there can be mentioned hydroquinone, cresol, and phenol derivatives.

As the sulfur type antioxidant, there can be mentioned alkylmercaptans and dialkyldisulfide derivatives.

As the amine type antioxidant, there can be mentioned naphthylamine, phenylene-diamine, and hydroquinoline derivatives.

Poly(methyl methacrylate) or the polymer composed mainly of methyl methacrylate, which is used as the starting material for obtaining the above-mentioned methacrylimide or N-substituted methacrylimide component, may be prepared according to the customary radical polymerization or ion polymerization. From the viewpoint of productivity, radical polymerization is preferred.

The polymerization catalyst used for obtaining the above-mentioned polymer is selected from azobis type catalysts such as azobisisobutyronitrile and 2,2'-azobis-(2,4-dimethylvaleronitrile), diacyl peroxide type catalysts such as lauroyl peroxide, benzoyl peroxide, and bis(3,5,5-trimethylhexanoyl) peroxide, and percarbonate catalysts.

The above-mentioned polymer may be obtained according to emulsion polymerization, suspension polymerization, bulk polymerization, or solution polymerization using a catalyst as described above. In order to obtain a polymer having a high purity, it is preferable to adopt the bulk polymerization process. In order to reduce the light transmission loss in the final product, it is especially preferred that the polymer be prepared according to the continuous bulk polymerization process.

In the light-transmitting fiber of the present invention, the core component is covered with the sheath component. This sheath component is formed of a polymer having a refractive index smaller by at least 1% than the refractive index of the core component copolymer. It is preferred that this polymer have a glass transition point higher than 80° C. and be substantially transparent.

The sheath component polymer may be selected, for example, from polymers of fluorinated alcohol esters of methacrylic acid, such as disclosed in Japanese Examined Patent Publication (Kokoku) No. 43-8978, No. 56-8321, No. 56-8322, and No. 56-8323 and Japanese Unexamined Patent Publication (Kokai) No. 53-60243, a vinylidene fluoride/tetrafluoroethylene copolymer such as disclosed in Japanese Examined Patent Publication (Kokoku) No. 53-42260, poly(methyl methacrylate), poly(vinylidene fluoride), poly(vinyl fluoride), a tetrafluoroethylene/hexafluoroethylene copolymer, a polysiloxane, poly(4-methylpentene-1), and an ethylene/vinyl acetate copolymer. As the fluorinated alcohol ester of methacrylic acid, there can be mentioned compounds represented by the following general formulae:

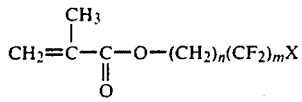

and

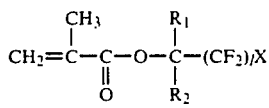

wherein X stands for H, F or C n is an integer of from 1 to 6, m is an integer of from 1 to 10, is an integer of from 1 to 10, and $R_1$ and $R_2$ each stand for H or $CH_3$, $C_2H_5$, or $CF_3$.

The above-mentioned fluoroalkyl ester of methacrylic acid may be homopolymerized or copolymerized with other polymerizable vinyl monomer. As the vinyl monomer, there can be mentioned methyl methacrylate, ethyl methacrylate, propyl methacrylate, butyl methacrylate, cyclohexyl methacrylate, glycidyl methacrylate, methacrylic acid, acrylic acid, maleic anhydride, methyl acrylate, ethyl acrylate, propyl acrylate, butyl acrylate, 2-ethylhexyl acrylate, benzyl acrylate, glycidyl acrylate, styrene, α-methylstyrene, vinyltoluene, 2,4-dimethylstyrene, p-chlorostyrene, 2,4-dichlorostyrene, p-methoxystyrene, acrylonitrile, methacrylonitrile, vinyl acetate, methylvinylketone, hydroxypropyl acrylate, and hydroxyethyl acrylate. Two or more of these monomers may be copolymerized. Among these monomers, methyl methacrylate is especially preferred because methyl methacrylate gives a transparent copolymer.

The sheath component polymer may be prepared according to the conventional radical polymerization process. Ordinary radical polymerization initiators can be used as the polymerization catalyst. For example, there can be mentioned organic peroxides such as di-tert-butyl peroxide, dicumyl peroxide, methylethylketone peroxide, tert-butyl perphthalate, tert-butyl perbenzoate, methylisobutylketone peroxide, lauroyl peroxide, cyclohexane peroxide, 2,5-dimethyl-2,5-di-tert-butyl peroxyhexane, tert-butyl peroctanoate, tert-butyl perisobutyrate, and tert-butylperoxyisopropyl carbonate and azo compounds such as methyl 2,2'-azobisisobutyrate, 1,1'-azobiscyclohexane-carbonitrile, 2-phenylazo-2,4-dimethyl-4-methoxyvaleoronitrile, 2-carbamoyl-azobisisonutyronitrile, 2,2'-azobis-2,4-dimethylvaleronitrile, and 2,2'-azobisisobutyronitrile.

As the polymerization process, there can be mentioned emulsion polymerization, suspension polymerization, bulk polymerization, and solution polymerization. In order to obtain a polymer having a high purity, it is preferable to adopt the bulk polymerization process.

In the light-transmitting fiber of the present invention, it is indispensable that the refractive index of the sheath component be smaller by at least 1% than that of the core component. If the difference of the refractive index between the two components is smaller than 1%, the apertures of the obtained light-transmitting fiber become too small and the light-transmitting fiber can hardly be put into practical use. If the refractive index of the sheath component is larger than that of the core component, the obtained fiber cannot transmit light.

Since the light-transmitting fiber is sometimes exposed to a high temperature for a long time, it is preferred that the light-transmitting fiber have good durability under this condition. For this purpose, it is preferred that the heat distortion temperature of the polymer of the sheath component be high, especially higher than 70° C., particularly especially higher than 90° C. It also is preferred that the glass transition point of the polymer of the sheath component be higher than 80° C.

The step-index type light-transmitting fiber of the present invention can be prepared according to the following processes.

(1) A composite spinning process in which a core component copolymer and a sheath component polymer are extruded in the form of a core-sheath structure from a special nozzle.

(2) A coating process in which a core component fiber is formed from the core component copolymer, the core component fiber is coated with a solution of the sheath component polymer, and the solvent is removed from the coating layer.

For formation of the core component, there may be adopted a process as disclosed in Japanese Examined Patent Publication (Kokoku) No. 48-131391, in which the core component polymer is continuously prepared by bulk polymerization and the polymer is then spun to form a core component fiber. This process is effective for reducing the light transmission loss of the core component.

It is preferred that the light-transmitting fiber of the present invention be drawn by at least 10% after spinning. If this drawing is not effected, the transparency is good but the bending resistance is poor, and the core component fiber is sometimes broken when it is wound around a pipe having a diameter of 20 mm.

The light-transmitting fiber of the present invention is especially excellent in heat resistance and durability over conventional plastic light-transmitting fibers including poly(methyl methacrylate) or polystyrene as the core component.

The light-transmitting fiber of the present invention is relatively cheap, has a good handling property, and is well balanced in various characteristics.

Accordingly, the light-transmitting fiber of the present invention can be used for wiring in an engine compartment of an automobile and is very significant and valuable from an industrial viewpoint as a material for car electronics.

The characteristic features and effects of the present invention will now be described in detail with reference to the following examples, which by no means limit the scope of the present invention.

The light transmission loss was determined as a parameter indicating the light-transmitting capacity. The measurement conditions were as follows.

Interference filter (main wavelength): 650 μm
Total length $l_o$ of fiber: 5 m
Cut length l of fiber: 4 m
Diameter D of bobbin: 190 mm The light transmission loss of the light-transmitting fiber was determined by means of an apparatus 1 shown in FIG. 1. in the following manner.

Referring to FIG. 1, this apparatus 1 includes a stabilized electric power source 2, a halogen lamp 3, a lens 4 an interference filter 5, a lens 6, a photodiode 7, an amplifier 8, and a voltmeter 9, arranged in the above-mentioned sequence. A light-transmitting fiber 10 having a predetermined length was placed between the lens 6 and the photodiode 7.

The halogen lamp 2 was connected to and excited by the electric power source 1. The light emitted from the halogen lamp 2 was converted to parallel rays by the lens 4 and then converted to monochromic light by the interference filter 5. The parallel rays of the monochronic light were focused on an end surface 11 of incidence of the optical fiber 10 by means of the lens 6, which had the same numerical aperture as that of the optical fiber 10, so as to transmit the monochromic light through the optical fiber 10. The monochromic light was attenuated during transmission through the optical fiber 10, and then transmitted through an opposite end surface 12 of the optical fiber 10. The transmitted light was converted to an electric current by means of the photodiode 7. The electric current was amplified by the amplifier 8. The voltmeter 9 measured the voltage of the amplified electric current. The foregoing operations were carried out in the dark.

For the measurement of the light transmission loss by the above-mentioned apparatus, 0.015 km of the optical fiber was prepared. The two ends of the optical fiber were cut at right angles to the longitudinal axis of the fiber and the end surfaces were polished smooth. The optical fiber was immovably fixed between the lens 6 and the photodiode 7. The voltage measuring operation was conducted on the optical fiber in the dark according to the above-mentioned method. Next, while the light-incident end surface 11 of the optical fiber was fixed as the focus of the monochromic light emitted through the lens 6, an opposite side portion of the original optical fiber, which had a length of 0.005 km, was cut off from the fiber. The residual optical fiber having a length of 0.01 km had a light-transmitting end surface 13 which was at right angles to the longitudinal axis of the optical fiber and was polished smooth.

The same voltage measuring operation as that described above was conducted on the residual optical fiber in the dark.

The light transmission loss of the optical fiber was calculated according to the following equation:

$$\alpha = \frac{10}{l} \log\left(\frac{I_2}{I_1}\right)$$

wherein $\alpha$ represents the light transmission loss in dB/km of the optical fiber, l represents the length in km of the cut portion of the optical fiber, $I_1$ represents a voltage measured for the original length $l_o$ of the optical fiber, and $I_2$ represents a voltage measured for the residual optical fiber.

The voltages $I_1$ and $I_2$ correspond to the quantities of the light transmitted out through the original optical fiber and the residual optical fiber, respectively.

In the examples, the interference filter exhibited a main wavelength of 650 μm. The optical fiber was wound around a bobbin having a diameter of 190 mm, and the light-incident end surface and the light-outgoing end surface of the optical fiber were spaced about 1 m from each other.

In the examples, the properties of the polymer were determined according to the following methods.

(1) Infrared absorption spectrum

The infrared absorption spectrum was determined according to the KBr disc method using an infrared spectrophotometer (Model 285 supplied by Hitachi, Ltd).

(2) Inherent viscosity

The flowing time (ts) of a 0.5% by weight solution of a sample polymer in dimethylformamide and the flowing time (to) of dimethylformamide were measured by a Deereax-Bischoff viscosity meter at a temperature of 25±0.1° C. The relative viscosity $\eta_{rel}$ was calculated from the value of ts/to, and the inherent viscosity was calculated according to the following equation:

Inherent viscosity = $(\ln \eta_{rel})/C$ wherein C stands for the concentration (g/100 ml) of the polymer in the solvent.

(3) The heat distortion temperature was measured according to the method of ASTM D-648.

(4) Melt index

The melt index of the polymer (g/10 minutes) was measured at 230° C. under a load of 3.8 kg according to the method of ASTM D-1238.

(5) Imide content

The imide content (%) of the polymer was determined from the nitrogen content obtained at elementary analysis (CHN Coder MT-3 supplied by Yanagimoto Seisakusho K.K.) and from the results of proton nuclear magnetic resonance analysis [JNM-FM-100 (JEOL) Spectrometer, 100 MHz].

(6) Thermal shrinkage factor

A sample of the light-transmitting fiber having a length of 50 cm was heated in the free length state in a hot air furnace at 130° C. for 1 hour. The percent shrinkage at this heat treatment was determined.

EXAMPLE 1

In 100 parts by weight of methyl methacrylate were incorporated and dissolved 0.75 part by weight of tert-dodecylmercaptan and 0.4 part by weight of lauroyl peroxide. A thermocouple was set in a cell defined by two reinforcing glass plates confronting each other at a space of 3 mm therebetween through a polyvinyl chloride gasket. The monomer solution was cast into the cell. The cell was immersed in warm water maintained at 80° C. to effect polymerization and curing. When 30 minutes passed after the inner temperature arrived at the peak by heat generated by polymerization advanced after immersion in warm water, the cell was taken out from the warm water and the heat treatment was carried out in an air heating furnace at 120° C. for 2 hours.

After cooling, the cell was disassembled. The obtained resin plate having a thickness of about 6 mm was pulverized in a clean box to obtain a polymer having a melt index of 13.0 (as measured at 230° C. under a load of 3.8 kg), a refractive index $n_D$ of 1.4920, a specific gravity of 1.190, and a heat distortion temperature of 105° C. Then, 100 parts by weight of this polymer, 26.4 parts by weight of 1,3-dimethylurea, 5.4 parts by weight of water, and 0.01 part by weight of Antage BHT (2,6-di-tert-butyl-p-cresol supplied by Kawaguchi Kagaku Kogyo K.K.) were charged in a 3-liter autoclave. The inside atmosphere was repeatedly replaced with nitrogen, and the heating reaction was carried out for 4 hours in an oil bath maintained at 230° C. to obtain a transparent resin, poly-N-methyl-methacrylimide. Absorptions attributed to N-methylmethacrylimide were observed at 1720, 1663, and 750 cm$^{-1}$ in the infrared absorption spectrum. The obtained polymer was characterized by a melt index of 3.5 (as measured at 230° C. under a load of 3.8 kg), a refractive index of 1.536, a specific gravity of 1.230 and a heat distortion temperature of 175° C.

Separately, a solution including 50 parts by weight of 2,2,2-trifluoromethyl methacrylate, 50 parts by weight of methyl methacrylate, and 0.3 part by weight of n-octylmercaptan was prepared, and 0.025 part by weight of azobisisobutyronitrile was incorporated and dissolved in the solution. The mixture was cast in a cell defined by two reinforcing glass plates confronting each other at a space of 5 mm therebetween through a polyvinyl chloride gasket. The cell was immersed in warm water maintained at 70° C. to effect polymerization and curing. When 30 minutes passed after the inner temperature arrived at the peak by heat generated by polymerization, the cell was taken out from the warm water and the heat treatment was carried out in an air heating furnace maintained at 130° C. After cooling, the cell was disassembled. The obtained resin plate was pulverized in a clean box to obtain a sheath component polymer having a melt index of 5.0 (as measured at 230° C. under a load of 3.8 kg), a refractive index $n_D$ of 1.445, and a heat distortion temperature (HDT) of 98° C.

The polymers of the core and sheath components were supplied to a vent type composite spinning machine provided with a core-sheath double structure spinneret. The polymers were spun at a spinning temperature of 260° C., and the spun fiber was taken up at a spinning speed of 3 m/min and was continuously drawn at a draw ratio of 2.0 at a temperature of 180° C., followed by winding.

The obtained fiber was a light-transmitting fiber having a concentric structure in which the diameter of the core component was 980 μm, the thickness of the sheath component was 10 μm, and the weight ratio of the core component to the sheath component was 96/4.

The light transmission loss of the light-transmitting fiber was 980 dB/km. The fiber could sufficiently transmit optical signals in a length of 10 m. When this light-transmitting fiber was heat-treated at 130° C. in the free length state for 1 hours, the percent shrinkage was 1%.

By using a cross-head type cable forming machine, the obtained light-transmitting fiber was covered with carbon-black-incorporated 6-6 nylon as the jacket polymer by using an aromatic polyamide fiber (Kevler ®) as the first reinforcing fiber so that the outer diameter was 1.6 mm. The fiber was further covered with a carbon-black-incorporated polyester elastomer as the second jacket so that the outer diameter was 2.2 mm, whereby an optical cable having a light transmission loss of 980 dB/km was obtained.

A specimen having a length of 10 m was cut out from this optical fiber. One end surface was secured to a light source (an interference filter having a main wavelength of 650 μm). The other end surface was secured and connected to a photodiode. An intermediate portion, having a length of 5 m, of the specimen was exposed to an air heating furnace at 130° C. The transmitted light quantity was traced, and the heat-resistant durability of the optical cable was evaluated.

As the result, it was found that even after 1000 hours, the light quantity was not reduced at all and the optical cable had a stable heat-resistant durability.

EXAMPLE 2

A core component polymer having a melt index of 1.50 and a refractive index of 1.530 was prepared in the same manner as described in Example 1, except that Acrypet VH (the tradename of the product supplied by Mitsubishi Rayon K.K.) (inherent viscosity =0.51 dl/g as determined in dimethylformamide at 25° C.) prepared by continuous bulk polymerization was used as poly(methyl methacrylate) instead of the polymer obtained by cast polymerization in Example 1. The obtained core component polymer was subjected to composite spinning together with the same sheath component polymer as used in Example 1. The spun fiber was drawn at a draw ratio of 2 to obtain a light-transmitting fiber. The obtained fiber had a light transmission loss of 660 dB/km and could sufficiently transmit optical signals by a length of 10 m.

EXAMPLE 3

An optical cable was prepared in the same manner as described in Example 1 except that poly(vinylidene fluoride) (having a refractive index of 1.43) was used as the sheath component polymer.

The light transmission loss of the obtained optical cable was 1500 dB/km. Even when the optical fiber was left in a hot air heating furnace maintained at 160° C. for 1000 hours, the ratio of reduction of the light quantity was very low and the optical cable had very excellent heat-resistant durability.

EXAMPLE 4

The core component polymer obtained in Example 1 was spun at a spinning temperature of 240° C. in a vent type spinning machine and taken out at a spinning speed of 6 m/min to obtain a fiber composed solely of the core component (having a diameter of 750 μm). A precursor composition for polydimethylsiloxane (Shinetsu Silicone KE106LTV) was uniformly coated on the surface of the core component fiber. The coated fiber was heated at 150° C. for 10 minutes to form a polydimethylsiloxane covering (having a refractive index of 1.42 and a thickness of 300 μm).

The light transmission loss of this optical fiber was 890 dB/km. When the optical fiber was exposed to a temperature of 160° C. for 1000 hours, the ratio of reduction of the light quantity was 2% and the optical fiber had very excellent heat-resistant durability.

EXAMPLE 5

Poly(methyl methacrylate) obtained by cast polymerization in the same manner as described in Example 1 was used. The imidizing reaction was carried out in the same manner as described in Example 1, except that 19 parts by weight of urea and 5.7 parts by weight of water were used instead of the 1,3-dimethylurea and water used in Example 1. A transparent pelletized polymer was obtained as the core component polymer.

The obtained polymer was characterized by a melt index of 4.0 (as measured at 230° C. under a load of 3.8 kg), a refractive index of 1.536, a density of 1.237, and a heat distortion temperature of 170° C.

The imidization ratio was 27% as determined from the infrared absorption spectrum.

The same 2,2,2-trifluoroethyl methacrylate/methacrylic acid copolymer as used in Example 1 was used as the sheath component.

The polymers of the core and sheath components were supplied to a vent type composite spinning machine provided with a core-sheath two-layer structure spinneret and spun at a spinning temperature of 260° C. The spun fiber was taken up at a spinning speed of 3 m/min and then drawn at a draw ratio of 2.0 at 200° C., followed by winding.

The obtained fiber was a light-transmitting fiber having a concentric structure in which the diameter of the core component was 980 μm, the thickness of the sheath component was 10 μm, and the weight ratio of the core component to the sheath component was 96/4. When the fiber was heated at 130° C. for 1 hour, the thermal shrinkage factor was 1%.

The light transmission loss of this light-transmitting fiber was 890 dB/km. The fiber could sufficiently transmit optical signals in a length of 10 m.

By using a cross-head type cable forming machine, the light-transmitting fiber was covered with carbon-black-incorporated polyethylene as the jacket polymer by using an aromatic polyamide fiber (Kevler ®) as the first reinforcing fiber so that the outer diameter was 1.6 mm. The fiber was further covered with a carbonblack-incorporated polyester elastomer as the second jacket so that the outer diameter was 2.2 mm, whereby an optical cable having a light transmission loss of 1050 dB/km was obtained.

A specimen having a length of 10 m was taken out from the optical cable. One end surface was secured to a light source (an interference filter having a main wavelength of 650 μm was used). The outer end surface was connected and secured to a photodiode. An intermediate portion, having a length of 5 mm, of the specimen was left in an air heating furnace at 130° C. for 1000 hours, and the quantity of the transmitted light was traced to evaluate the heat-resistant durability of the optical cable.

As the result, it was found that even after 1000 hours, reduction of the light quantity was not caused and the optical cable had good heat-resistant durability.

EXAMPLE 6

An optical cable was prepared in the same manner as described in Example 5, except that poly(vinylidene fluoride) (having a refractive index of 1.43) was used as the sheath component polymer.

The light transmission loss of the optical fiber was 1530 dB/km. When the optical cable was exposed to an air heating furnace at 160° C. for 1000 hours, reduction of the light quantity was 4%. The optical fiber had very excellent heat-resistant durability.

EXAMPLE 7

The core component type polymer obtained in Example 5 was spun at a spinning speed of 240° C. in a vent type spinning machine and taken up at a spinning speed of 6 m/min to obtain a fiber composed solely of the core component (having a diameter of 750 μm). A precursor composition for polydimethylsiloxane (Shinetsu Silicone KE106LTU) was uniformly coated on the surface of the core component fiber and the coated fiber was heated at 150° C. for 10 minutes to obtain a polydimethylsiloxane (having a refractive index of 1.42 and a thickness of 300 μm).

The light transmission loss of this optical fiber was 920 dB/km. The ratio of reduction of the light quantity by 1000 hours' exposure at 150° C. was 2%. It was confirmed that the optical fiber had very excellent heat-resistant durability.

EXAMPLE 8

A 3-liter autoclave was charged with 100 parts by weight of the same poly(methyl methacrylate) as prepared in Example 1 and 62 parts by weight of a methanol solution of methylamine (40%). The inside atmosphere was repeatedly replaced with nitrogen. The reaction was carried out for 3 hours in an oil bath maintained at 230° C. to obtain a transparent resin, that is, an N-methylmethacrylimide/methyl methacrylate copolymer.

In the nuclear magnetic resonance analysis, absorptions attributed to the methacrylimide were observed. The imidization ratio was 60%.

The obtained polymer was characterized by a melt index of 5.7 (as measured at 230° C. under a load of 3.8 kg), a refractive index of 1.530, a specific gravity of 1.20, and a heat distortion temperature of 137° C.

In a vent type spinning machine, this core component polymer was spun at a spinning temperature of 240° C. and taken up at a spinning speed of 6 m/min to obtain a fiber composed solely of the core component (having a diameter of 750 μm). A precursor composition for polydimethylsiloxane (KE106LTV supplied by Shinetsu Silicone K.K.) was uniformly coated on the surface of the core component fiber. The coated fiber was heated at 150° C. for 10 minutes to form a polydimethylsiloxane covering (having a refractive index of 1.42 and thickness of 300 μm).

The light transmission loss of this optical fiber was 820 dB/km. When the optical fiber was exposed at 130° C. for 1000 hours, the ratio of reduction of the light quantity was 1%. Thus, it was confirmed that the optical fiber had very excellent heat-resistant durability. When the optical fiber was heat-treated at 130° C. for 1 hour, the thermal shrinkage factor was 2%.

EXAMPLE 9

A solution comprising 90 parts by weight of methyl methacrylate, 10 parts by weight of methacrylic acid, 0.75 part by weight of tert-dodecylmercaptan, and 0.4 part by weight of lauroyl peroxide was prepared. A methyl methacrylate/methacrylic acid copolymer was formed from this solution in the same manner as described in Example 8.

According to the same imidization process as described in Example 8, there was obtained an N-methylmethacrylimide/methyl methacrylate copolymer.

The obtained polymer was characterized by a melt index of 7.5 (as measured at 230° C. under a load of 3.8 kg), a refractive index of 1.529, a specific gravity of 1.20, and a heat distortion temperature of 135° C.

In the same manner as described in Example 8, a fiber composed solely of the core component was prepared and was covered with the sheath component.

The light transmission loss of the obtained optical fiber was 950 dB/km, and the ratio of reduction of the light quantity after 1000 hours' exposure at 130° C. was 1.5%. Thus, it was confirmed that the optical fiber had very excellent heat-resistant durability.

EXAMPLE 10

A 3-liter autoclave was charged with 100 parts by weight of the same poly(methyl methacrylate) as prepared in Example 1 and 15 parts by weight of dry ammonia gas. The inside atmosphere was repeatedly replaced with nitrogen. The reaction was carried out for 3 hours in an oil bath maintained at 230° C. to obtain a transparent resin, that is, a methacrylimide/methyl methacrylate copolymer.

In the nuclear magnetic resonance analysis, absorptions attributed to methacrylimide were observed. The imidization ratio was 23%.

The obtained polymer was characterized by a melt index of 6.2 (as measured at 230° C. under a load of 3.8 kg), a refractive index of 1.507, a specific gravity of 1.219, and a heat distortion temperature of 142° C.

In a vent type spinning machine, this core component polymer was spun at a spinning temperature of 240° C. and taken up at a spinning speed of 6 m/min to obtain a fiber composed solely of the core component (having a diameter of 750 μm). A precursor composition for polydimethylsiloxane (KE106LTU supplied by Shinetsu Silicone K.K.) was uniformly coated on the surface of the core component fiber, and the coated fiber was heated at 150° C. for 10 minutes to form a polydimethylsiloxane covering (having a refractive index of 1.42 and a thickness of 300 μm).

The light transmission loss of this optical fiber was 850 dB/km, and the ratio of reduction of the light quantity after 1000 hours' exposure at 130° C. was 1%. It was thus confirmed that the optical fiber had very excellent heat-resistant durability.

EXAMPLE 11

A solution comprising 80 parts by weight of methyl methacrylate, 10 parts by weight of methacrylic acid, 10 parts by weight of tert-butyl methacrylate, 0.75 parts by weight of tert-dodecylmercaptan, and 0.4 part by weight of lauroyl peroxide was prepared. According to the same method as described in Example 8, a methyl methacrylate/methacrylic acid/tert-butyl methacrylate copolymer was formed from the solution.

By carrying out the imidization in the same manner as described in Example 8, a methacrylimide/methyl methacrylate copolymer was prepared.

The obtained polymer was characterized by a melt index of 7.0 (as measured at 230° C. under a load of 3.8 kg), a refractive index of 1.530, a specific gravity of 1.235, and a heat distortion temperature of 160° C.

The ratio of the imidization ratio determined from the nuclear magnetic resonance analysis was 47%.

In the same manner as described in Example 10, a fiber composed solely of the core component was prepared and covered with the sheath component.

The light transmission loss of this optical fiber was 970 dB/km, and the ratio of reduction of the light quantity after 1000 hours' exposure at 150° C. was 1.0%. It was thus confirmed that the optical fiber had very excellent heat-resistant durability.

COMPARATIVE EXAMPLE 1

The same poly(methyl methacrylate) as obtained in Example 1 was used as it was, and the same sheath component polymer as prepared in Example 1 was used. Both the polymers were supplied to a vent type composite spinning machine, spun at a spinning temperature of 240° C., taken up at a spinning speed of 3 m/min, and subsequently drawn at a draw ratio of 2.0 at 140° C., followed by winding.

The obtained fiber had a core component diameter of 980 μm and a sheath component thickness of 10 μm.

The light transmission loss of this light-transmitting fiber was 170 dB/km, and the thermal shrinkage factor was 49%.

The jacket-covering treatment was carried out in the same manner as described in Example 1. When the obtained cable was exposed at 120° C. for 1000 hours, reduction of the light quantity was extreme and the ratio of reduction of the light quantity was 100%. It was impossible to transmit light through this cable.

We claim:

1. A light-transmitting fiber comprising a core component and a sheath component covering the core component, the core component consisting essentially of a polymer comprising 2% to 100% by weight of ring structure units represented by the following general formula (I):

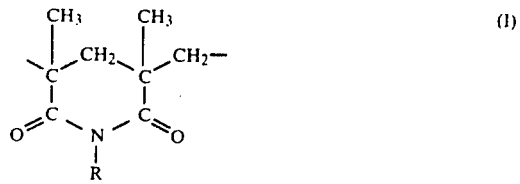

wherein R stands for a hydrogen atom or an aliphatic, alicyclic, or aromatic hydrocarbon group having 1 to 20 carbon atoms,
and 0% to 98% by weight of monomer units composed mainly of methyl methacrylate, and the sheath component being composed of a polymer having a refractive index smaller by at least 1% than that of the polymer of the core component.

2. A light-transmitting fiber as set forth in claim 1, wherein the core component contains at least 10% by weight of the ring structure units.

3. A light-transmitting fiber as set forth in claim 1, wherein the polymer of the core component is drawn by at least 10% after spinning.

4. A light-transmitting fiber as set forth in claim 1, wherein the polymer of the core component has a heat distortion temperature of at least 110° C.

5. A light-transmitting fiber as set forth in claim 1, wherein its thermal shrinkage factor after 1 hour's heat treatment at 130° C. is smaller than 5%.

6. A light-transmitting fiber as set forth in claim 1, wherein R in the general formula (I) is a hydrogen atom or an aliphatic hydrocarbon group having 1 to 4 carbon atoms.

7. A light-transmitting fiber as set forth in claim 6, wherein the aliphatic hydrocarbon group is selected from methyl, ethyl, propyl, isopropyl, butyl, isobutyl, and tert-butyl.

8. A light-transmitting fiber as set forth in claim 1, wherein R in the general formula (I) is an aromatic hydrocarbon group having 6 to 10 carbon atoms.

9. A light-transmitting fiber as set forth in claim 8, wherein the aromatic hydrocarbon group is selected from phenyl and substituted phenyl.

* * * * *